United States Patent [19]
Jung et al.

[11] Patent Number: 5,671,093
[45] Date of Patent: Sep. 23, 1997

[54] ANAMORPHIC LENS FOR A CCD CAMERA APPARATUS

[76] Inventors: Jin-Ho Jung, D-105 National Housing, 327 Jin-ri, Icheon-gun, Kyeongki-do; Jong-Wung Lee, 36 Neduk-dong, Cheongju-shi, Chungcheongbuk-do, both of Rep. of Korea

[21] Appl. No.: 610,653

[22] Filed: Mar. 4, 1996

Related U.S. Application Data

[63] Continuation-in-part of Ser. No. 347,069, Nov. 23, 1994, abandoned.

[30] Foreign Application Priority Data

Nov. 18, 1993 [KR] Rep. of Korea ............... 93-24660

[51] Int. Cl.$^6$ ............... G02B 13/08; G02B 3/06
[52] U.S. Cl. ............... 359/668; 359/668; 359/671; 359/710
[58] Field of Search ............... 359/670, 671, 359/668, 710

[56] References Cited

U.S. PATENT DOCUMENTS 3,924,933  12/1975  Hirose ............... 359/670
3,990,785  11/1976  Hirose ............... 359/670

*Primary Examiner*—Georgia Y. Epps
*Assistant Examiner*—John P. Cornely
*Attorney, Agent, or Firm*—Hazel & Thomas

[57] ABSTRACT

The present invention relates to an anamorphic lens for a CCD camera apparatus used for inspecting a semiconductor chip during the manufacturing process. The reduced image of the semiconductor chip being inspected is formed at a magnification of 0.25 times in the horizontal direction and a magnification ratio of 1:1 in the vertical direction. The anamorphic lens system for the CCD camera apparatus includes two spherical lens sets each having five lenses, and an afocal cylindrical lens system through which the image is formed in different ratios between its length and width. The spherical lens sets are positioned face-to-face on the same axis line. The afocal lens system includes an indefinite distance in its focus point, and the different magnification between length and width is positioned in a space between the two spherical lens sets. As a result, the image of the semiconductor chip being inspected is formed on a general CCD element 6.6 mm×8.8 mm in size after it is reduced by 0.25 times.

3 Claims, 6 Drawing Sheets

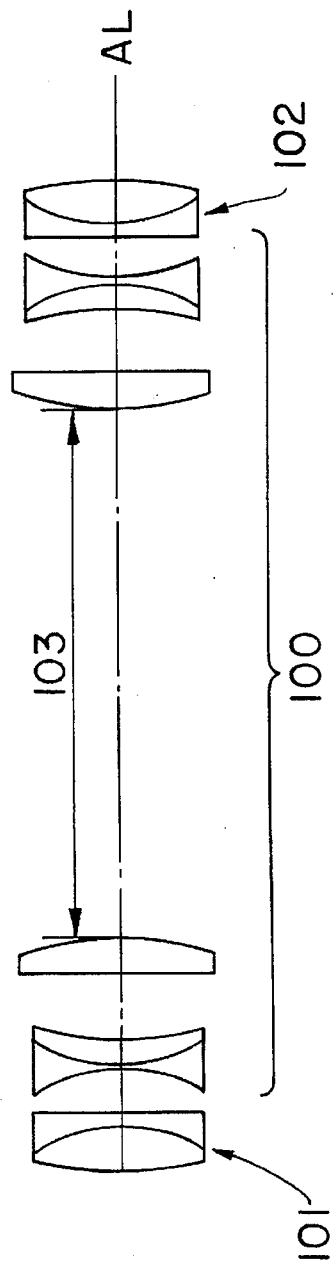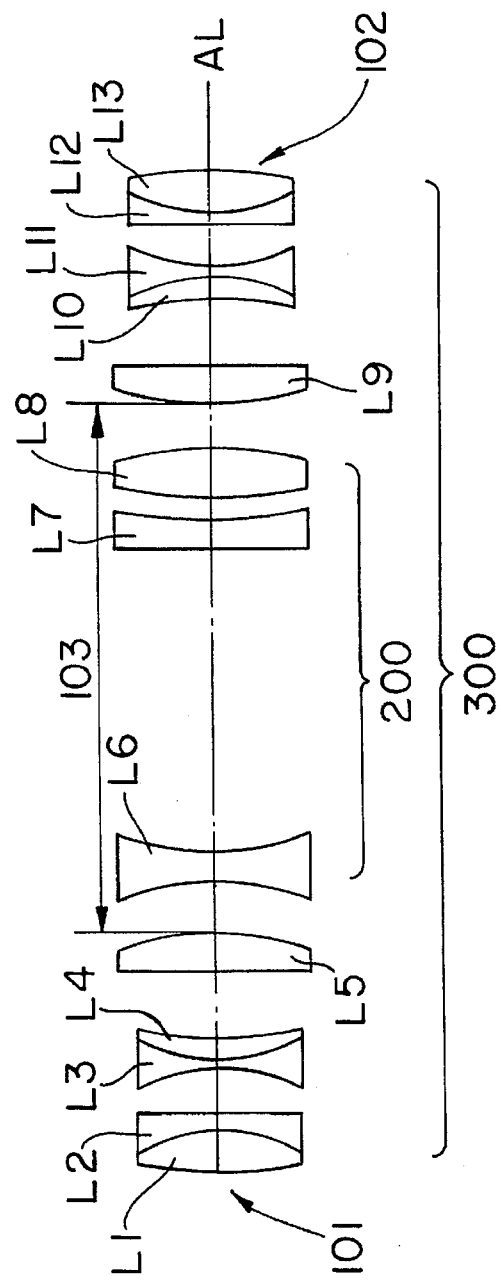

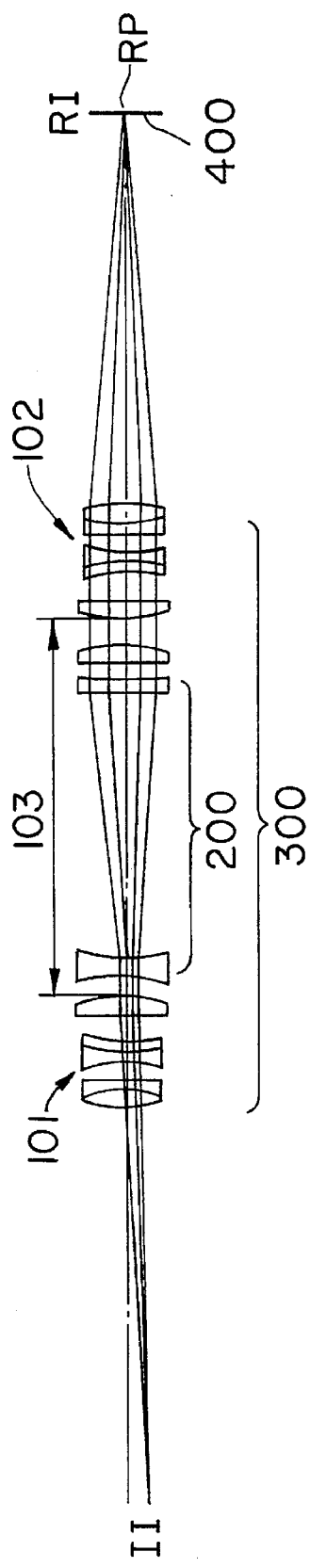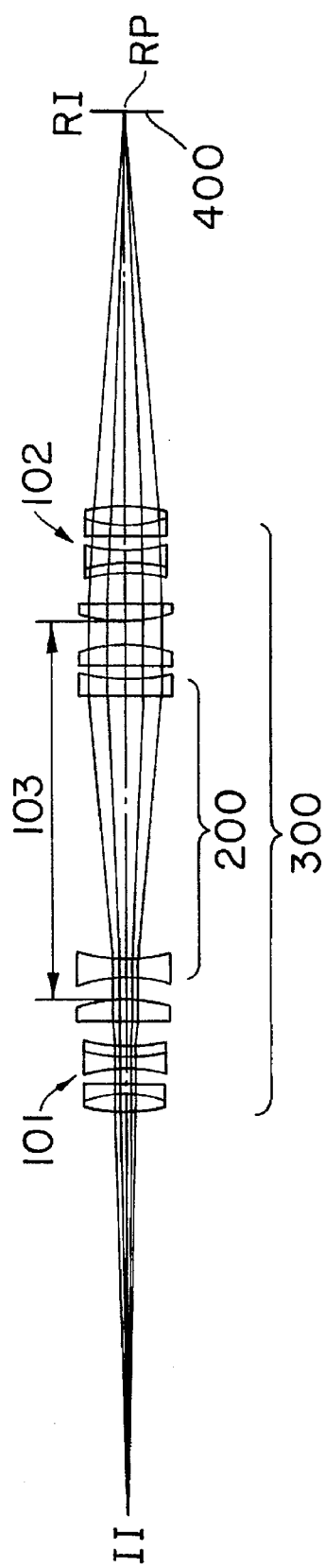

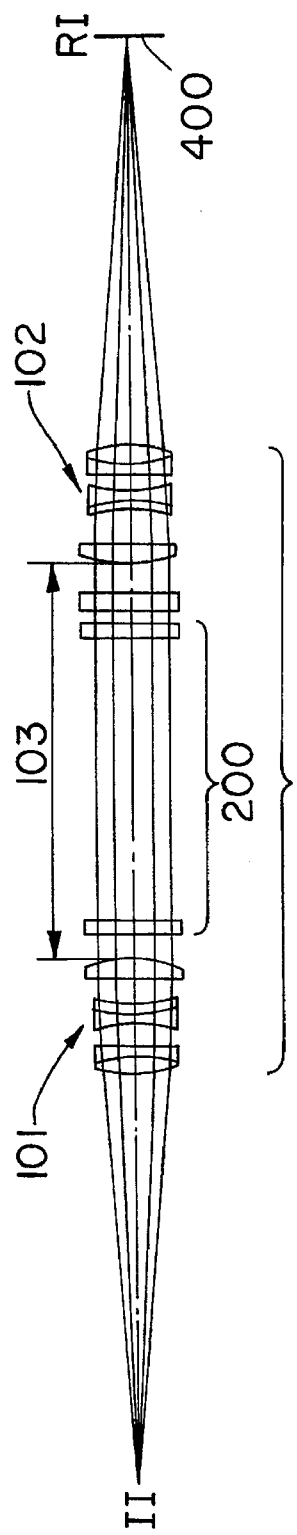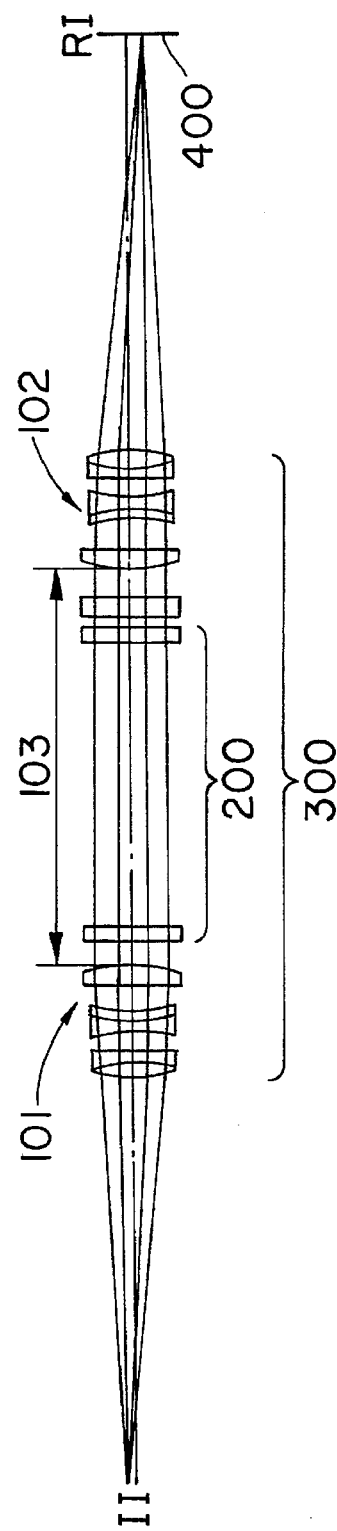

ANAMORPHIC LENS FOR A CCD CAMERA APPARATUS

This application is a continuation-in-part filed under 37 C.F.R. §1.53 of U.S. patent application Ser. No. 08/347,069 filed Nov. 23, 1994, abandoned, on behalf of the inventors JIN-HO JUNG and JONG-WUNG LEE.

BACKGROUND OF THE INVENTION

Generally, when the leads in a standard 5×25 mm semiconductor chip are optically inspected for their length using a general lens system, the image size of the semiconductor chip is typically reduced by 0.3 times in order to project the image of the semiconductor chip onto a standard 6.6×8.8 mm CCD element of a CCD camera system. In doing the image reduction, the size of the reduced image must be limited to 1.5×7.5 mm.

By using a conventional and general CCD element in the CCD camera system, the image of the semiconductor chip is composed of only 109 pixels, which corresponds to 1.5 mm of the 6.6 mm length of the CCD element and 480 pixels on the vertical line of the pixel area. As a result, only a very small-sized image is formed on the CCD element, thereby resulting in large tolerances for error in the rate of measurement between the actual semiconductor chip dimensions and the image dimensions.

To correct these tolerances, expensive CCD elements designed with double the number of pixels are typically used. These expensive CCD elements can improve imaging performance by two times, thereby reducing the difference between the actual semiconductor chip size and the image size. However, by using these high resolution CCD elements, the price of the whole CCD camera system for conducting the inspections increases by approximately ten times.

Applicants have found that it is inefficient to employ expensive, high-resolution CCD elements in measuring/inspection systems. As shown in FIG. 9, a conventional measuring apparatus for semiconductor chips that does have some economical advantages is composed of a general lens system (R), four mirrors of M1, M2, M3 and M4 and a general CCD element. In operation, the mirrors M2 and M3 are inclined by 45° and are slanted both vertically and horizontally. A subject image passes through the general lens system (R) and projects onto the general CCD element.

However, in the above conventional measuring apparatus in which reflection is employed, the overall optical system is complicated and difficult to produce. Moreover, this optical system needs constant and often troublesome readjustment due to the system's sensitivity to even the smallest level of shock, vibration, etc.

Consequently, there exists a need for a system that can optically inspect semiconductor chips while overcoming the problems of unacceptable error tolerances, structural complexity and excessive cost currently suffered by the prior art.

SUMMARY OF THE INVENTION

In view of the problems in the prior art, as discussed above, a main object of the present invention is to provide a system that eliminates the high error tolerances present in conventional systems.

Another object of the present invention is to provide a system that is structurally simple and rugged in order to eliminate the need for constant readjustment.

A further object of the present invention is to provide a system that is structurally simple so as to minimize the cost of constructing and maintaining the system.

In one application of the present invention, the apparatus is used for sorting out acceptable samples from inferior samples based on the measurements made. A semiconductor chip to be inspected is made by conventional production methods, and inspected in order to sort acceptable chips from inferior chips using an inspection process incorporating the present invention. The inspection process includes measuring whether the semiconductor chip's leads are produced proportionally.

Based on the above objects, the present invention relates to an anamorphic lens for a CCD camera apparatus and, in particular, to an anamorphic lens in which the imaging magnification is predetermined at an image ratio of 0.25 times in the length-wise direction and 1.00 times in the width-wise direction to compensate for when the ratio of the length and width of a semiconductor chip to be inspected does not correspond directly with the image dimension ratio of the CCD element in the apparatus. In addition, the present invention is directed to an optical system in an apparatus for measuring with an accuracy of about 0.01 mm whether the image length of the leads in semiconductor chips to be inspected are produced proportional to the actual length of the semiconductor chip's leads. Further, the present invention relates to an anamorphic lens for a CCD camera apparatus comprising an optical system in which a 5 mm×25 mm semiconductor chip can be measured by 6.6 mm×8.8 mm CCD elements, and a 5 mm×25 mm semiconductor chip can be imaged in different ratios of length and width.

For the purpose of solving the problems in the prior art, the present invention comprises five lenses for revising image aberrations with a magnification of 1:1, and an afocal cylindrical lens system in which magnification differs in the vertical and horizontal directions so that a specific arrangement for measuring precisely within 0.01 mm can be achieved.

In the present invention, two sets of spherical lens systems, each with a predetermined focal distance, are provided face-to-face. The afocal cylindrical lens system is provided between the two sets of spherical lens systems so that an object can be imaged in mutually different magnifications in the vertical and horizontal directions.

Further, in the present invention, the magnification in the vertical direction is set at 1:1 and only magnification in the horizontal direction is reduced 0.25 times.

BRIEF DESCRIPTION OF THE DRAWINGS

The invention will be further described in conjunction with the accompanying drawings, in which:

FIG. 2 is a cross-sectional component view of an anamorphic imaging optical system according to the present invention wherein two sets of 200 mm focal distance lenses composed of five lenses each are positioned face to face and the image is formed with a magnification of 1:1;

FIG. 3A is a cross-sectional component view of an anamorphic imaging optical system according to the present invention wherein an afocal cylindrical optical system is provided between two anamorphic imaging optical systems and the magnification of an image is reduced by 0.25 times in the width-wise direction;

FIG. 4 is a component and optical-path view of an anamorphic imaging optical system according to the present invention wherein a 25 mm width of an image is reduced to 6.25 mm by 0.25 times;

FIG. 5 is a component and imaging view of an anamorphic imaging optical system according to the present invention illustrated in FIG. 4 wherein an image is focused on a reduced point;

FIG. 6 is a component and optical-path view of an anamorphic imaging optical system according to the present invention wherein an image is formed at a 1:1 magnification through the cylindrical optical system with the image positioned in the center of the vertical direction;

FIG. 7 is a component and optical-path view of an anamorphic imaging optical system according to the present invention wherein an image is formed at a 1:1 magnification through the cylindrical system with the image positioned offset from the center of the vertical direction;

DETAILED DESCRIPTION OF THE PREFERRED EMBODIMENT

Figure 1:
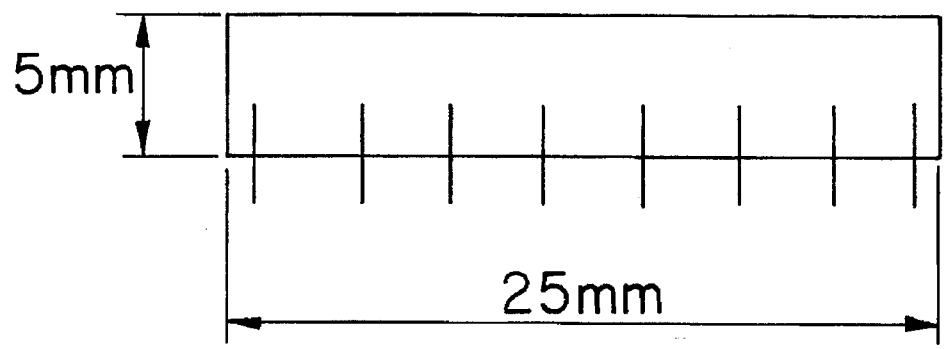
FIG. 1 is an explanatory view where a size of a semiconductor chip to be measured is illustrated.
Figure 8:
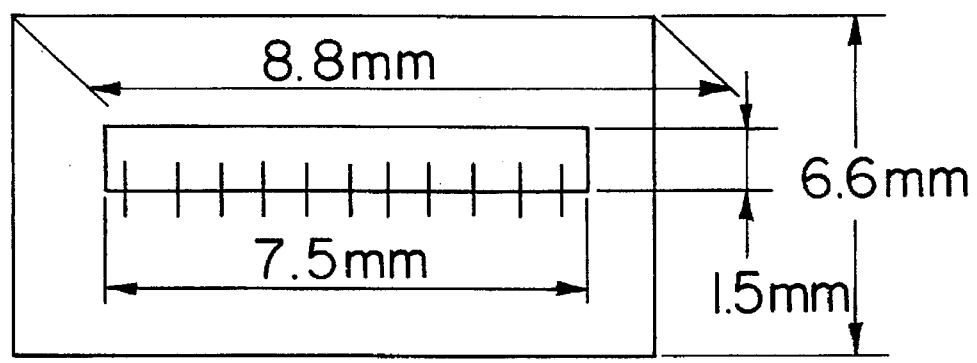
FIG. 8 is an imaging component and explanatory view showing a general CCD element with a semiconductor chip imaged on the CCD element through a general lens.

With reference to the figures, like reference characters will be used to indicate like elements throughout the several embodiments and views thereof. In particular, with reference to FIGS. 2 through 7, reference numeral 100 designates a spherical lens system, 101 the first lens, 102 the second lens, 103 a space, 200 an afocal cylindrical lens system, 300 an anamorphic lens system, and 400 a CCD element.

FIG. 1 is an explanatory view illustrating the size of the semiconductor chip to be measured. As shown, a typical semiconductor chip to be inspected has dimensions measuring 25 mm in length and 5 mm width.

FIG. 2 is a cross-sectional component view of an anamorphic optical system according to the present invention, wherein a spherical lens system 100 of the present invention incorporates first and second anamorphic sets of lenses 101, 102. Each set 101,102 is composed of five lenses positioned face-to-face and designed such that the resulting image is formed with a magnification of 1:1. The first set of lenses 101 is composed of lenses L1 through L5. The second set of lenses 102 is composed of lenses L9 through L13. The first and second sets of lenses 101, 102 are composed of the same selection of lenses and are positioned on the same axis line AL with a predetermined space 103 between them.

As shown in FIG. 3A, an afocal cylindrical lens system 200 is then incorporated between the first and second lens anamorphic sets 101, 102 in the space 103, thereby embodying an anamorphic lens system 300 according to the present invention. The afocal cylindrical lens system 200 is formed whereby the magnification in the horizontal direction differs from the magnification in the vertical direction. Each of the spherical lens system 100 and the afocal cylindrical lens system 200 is fixed at a predetermined position relative to each other within a mirror cylinder (not shown) of the anamorphic lens system 300.

In addition, the first and second lens sets 101, 102 are positioned on opposite ends of the predetermined space 103 face-to-face. Each lens within the lens sets 101, 102 is selected to set up the focal distance at 200 mm. Further, the two sets 101,102 are positioned to produce a magnification of 1:1.

The afocal lens system 200 is composed of three lenses L6 through L8, and is defined to have a magnification of an image that does not vary in the vertical direction but reduces by 0.25 times in the horizontal direction. In the preferred embodiment of the present invention, the afocal lens system 200 is fixed in the space 103 using a barrel (not shown).

FIGS. 4 and 5 both show the optical-path of an input image II of 25 mm reduced to 6.25 mm by a magnification of 0.25 times with the resulting image RI focused at a reduced point RP passing through the anamorphic lens system 300 of the present invention. As illustrated in FIG. 4, the input image II can be off-center from the axis line AL, while the resulting image RI at the reduced point RP will be centered on a CCD element 400. Similarly, in FIG. 5, the input image II is centered on the axis line AL with the resulting image RI at the reduced point RP still centered on the CCD element 400. The width of the input image II passing on the axis line AL of the first and second anamorphic lens sets 101, 102 is refracted in the horizontal direction relative to the axis line AL, whereby only the length of the input image II is reduced by the magnification of 0.25 times.

To exemplify the operation of the afocal lens system 200 in the present invention, FIGS. 6 and 7 illustrate where the afocal lens system 200 is removed. Without the afocal lens system 200, the magnification of an input image II is not changed in the vertical direction, whereby the resulting image RI is formed centered on the CCD element 400 at a 1:1 magnification and without reducing the width of the input image II.

Figure 3B:
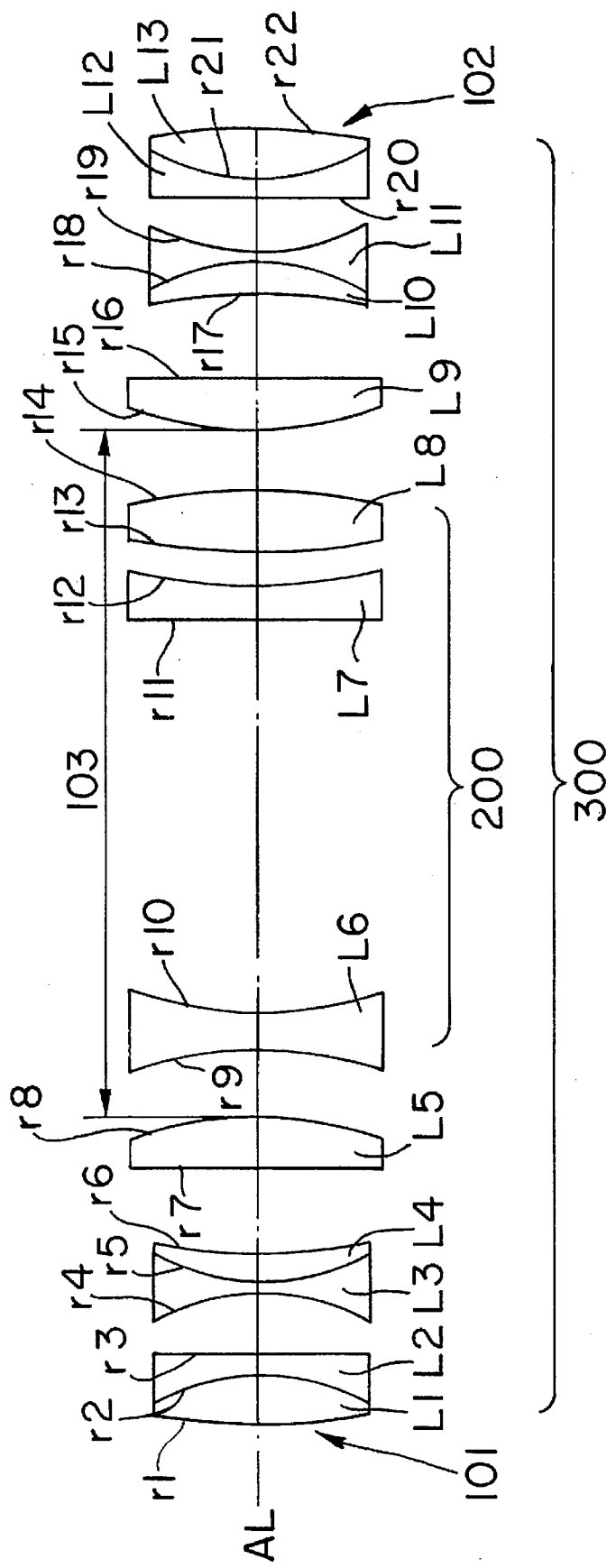
FIG. 3B is a cross-sectional component view of the anamorphic imaging optical system according to the present invention shown in FIG. 3A, wherein the lenses, the radius of curvature of each lens and the thickness of and distance between each lens are identified.
Figure 9:
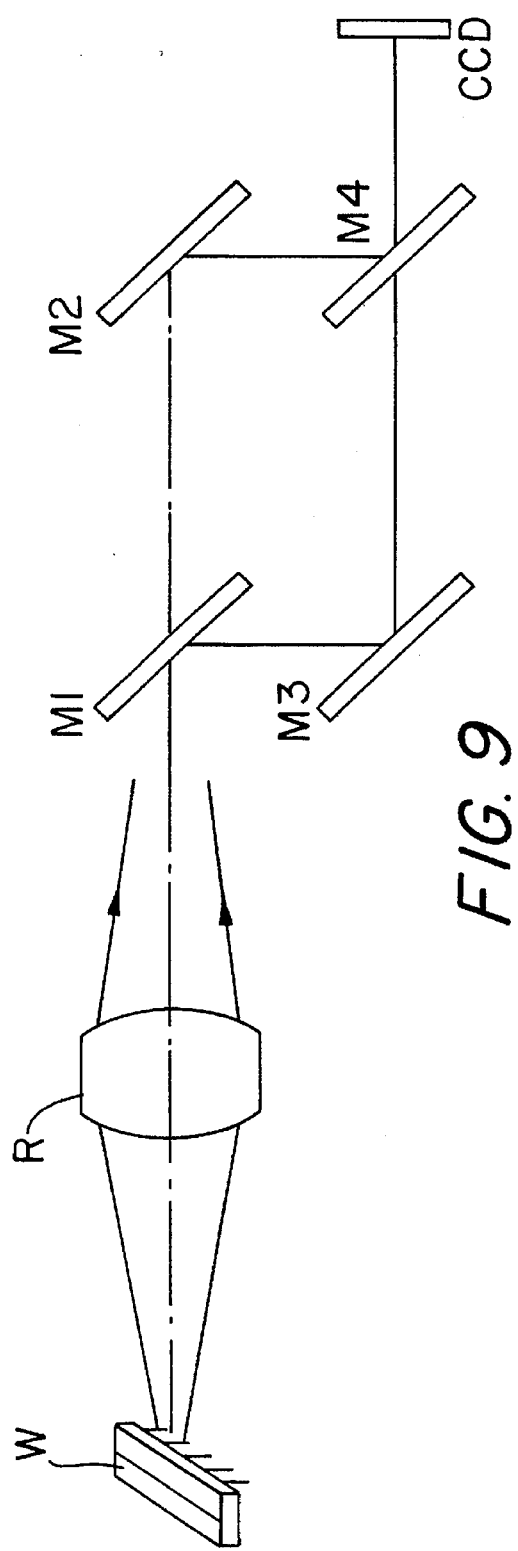
FIG. 9 is an imaging component view showing a general CCD element with a semiconductor chip imaged through a general lens and four mirrors.
Figure 10:
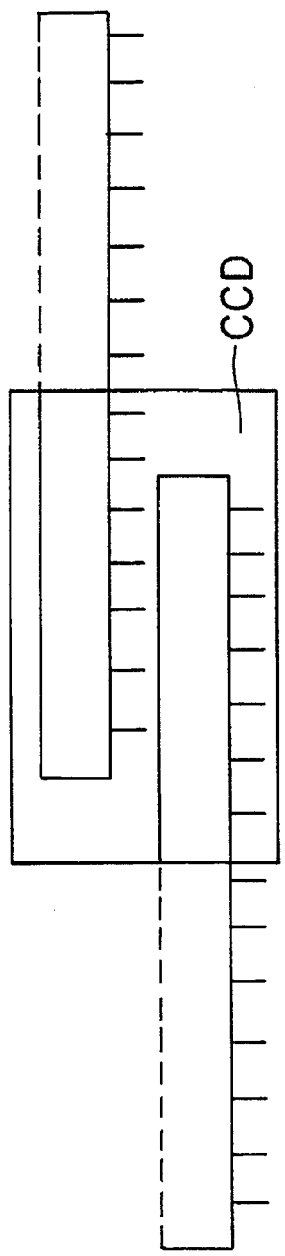
FIG. 10 is an imaging component and explanatory view showing a general CCD element with an object image of a semiconductor chip projected through the CCD element of FIG. 9.

As shown in FIG. 3B, the anamorphic lens system 300 of the present invention is composed of an arrangement of lenses L1 through L13 arranged in the first and second lens sets 101, 102 and the afocal lens system 200. The lenses L1 through 13 together have 22 predefined curvatures r1 through r22, whereby each lens has a characteristic defined by those curvatures. The refraction ratios of the individual lenses L1 through L13 are then determined by predefined thicknesses or distances t1 through t22 and the glass-type selected for the individual lenses.

Table 1 lists the radius of curvature, thickness, glass-type and effective diameter for each of the lenses L1 through L13. In Table 1, the column listing the thicknesses of the lenses is formatted wherein a particular "thickness" is defined as the distance from corresponding radius of curvature to the next proceeding radius of curvature (as measured along the axis line AL) or to the surface of the CCD element 400 where the resulting image RI is formed. For example, the thickness t1 is actually the distance from the radius of curvature r1 to the radius r2 as measured along the axis line AL. In this column, the first value of 125.15 is actually the distance from the object from which the input image II originates to the first radius of curvature r1 of the lens L1.

In operation, the image of an object being inspected through the present invention is reduced at a magnification of 0.25 times in the horizontal direction. In the specific application of inspecting semiconductor chips having a 5 mm height and a 25 mm length, the size of the resulting reduced image measures 5 mm in height and 6.25 mm in length.

TABLE 1

| Radius Number (r#) | Radius of Curvature (mm) | Thickness/ Distance (mm) | Glass Type | Effective Diameter (mm) |
|---|---|---|---|---|
| | object | 125.15 | | |
| 1 | 91.249 | 5.29 | LaF-2 | 26.0 |
| 2 | −34.705 | 2.75 | F-1 | 26.0 |
| 3 | ∞ | 5.49 | | 26.0 |
| 4 | −41.783 | 2.0 | SF-7 | 26.0 |
| 5 | 35.859 | 3.25 | SF-18 | 26.0 |
| 6 | 79.541 | 9.21 | | 26.0 |
| 7 | 349.108 | 5.73 | LaK-8 | 30.0 |
| 8 | −55.245 | 7.49 | | 30.0 |
| 9 | −51.349* | 4.25 | BaF-10 | 30.0(H) × 12.0(V) |
| 10 | 41.331* | 86.048 | | 30.0(H) × 12.0(V) |
| 11 | ∞ | 4.20 | SF-1 | 28.0(H) × 28.0(V) |
| 12 | 116.991* | 3.45 | | 28.0(H) × 28.0(V) |
| 13 | 142.594* | 6.5 | Sk-16 | 28.0(H) × 28.0(V) |
| 14 | −69.690* | 3.75 | | 30.0(H) × 12.0(V) |
| | stop | 3.75 | | 27.0 |
| 15 | 55.245 | 5.73 | LaK-8 | 30.0 |
| 16 | −349.108 | 9.21 | | 30.0 |
| 17 | −79.541 | 3.25 | SF-18 | 26.0 |
| 18 | −35.859 | 2.0 | SF-7 | 26.0 |
| 19 | 41.783 | 5.49 | | 26.0 |
| 20 | ∞ | 2.75 | F-1 | 26.0 |
| 21 | 34.705 | 5.29 | LaF-2 | 26.0 |
| 22 | −91.249 | 125.15 | | 26.0 |
| | image | | | |

*Cylindrical plane

As a result, the present invention allows the length of a semiconductor chip's lead to be measured without using expensive, high-resolution CCD elements. Since the height of a semiconductor chip being inspected is imaged at a magnification of 1:1, a general CCD element may be used without compromising the accuracy or tolerance of any measurement made.

As described above, the lenses incorporated into the present invention are positioned on the same axis line and fixed whereby the positions of the lenses do not change. Consequently, the lens system of the present invention is made immune to any shock which the lens system may suffer. In addition, the above-described construction of the lens system allows the present invention to be easily and efficiently produced and assembled with a high level of reliability.

Although the present invention has been fully described in connection with the preferred embodiment thereof with reference to the accompanying drawings, it is to be noted that various changes and modifications are apparent to those skilled in the art. For example, the present invention can be applied to an image processing optical system for the automatic inspection of marking in a semiconductor device when the ratio between the length, width and breadth of the markings do not correspond with the ratio of the dimensions of the CCD element in the CCD camera system conducting the inspection. These and other changes and modifications are to be understood as included within the scope of the present invention as defined by the appended claims, unless they depart therefrom.

What is claimed is:

1. An anamorphic lens system for a CCD camera system for optically inspecting and measuring the size of a manufactured product comprising:

first and second spherical lens devices, said first and second spherical lens devices being identical to each other; and an afocal cylindrical lens device formed to generate an image having a length-wise input image-to-resulting image ratio different from a width-wise input image-to-resulting image ratio thereof; wherein said first and second spherical lens devices are positioned face-to-face opposite each other with a predetermined space therebetween whereby image aberrations through said first and second spherical lens devices are eliminated with a magnification of 1:1, and said afocal cylindrical lens device is positioned between said first and second spherical lens devices in said predetermined space.

2. An anamorphic lens system according to claim 1, wherein each of said first and second spherical lens devices includes a combination of five lenses, each said combination of five lenses being identical to each other.

3. An anamorphic lens system according to claim 1, wherein said length-wise input image-to-resulting image ratio is set to a reduction of 0.25 with a length-wise direction being defined in a horizontal direction, and said width-wise input image-to-resulting image ratio is set to a magnification of 1.00 with a width-wise direction being defined in a vertical direction.

* * * * *